United States Patent Office 3,561,225
Patented Feb. 9, 1971

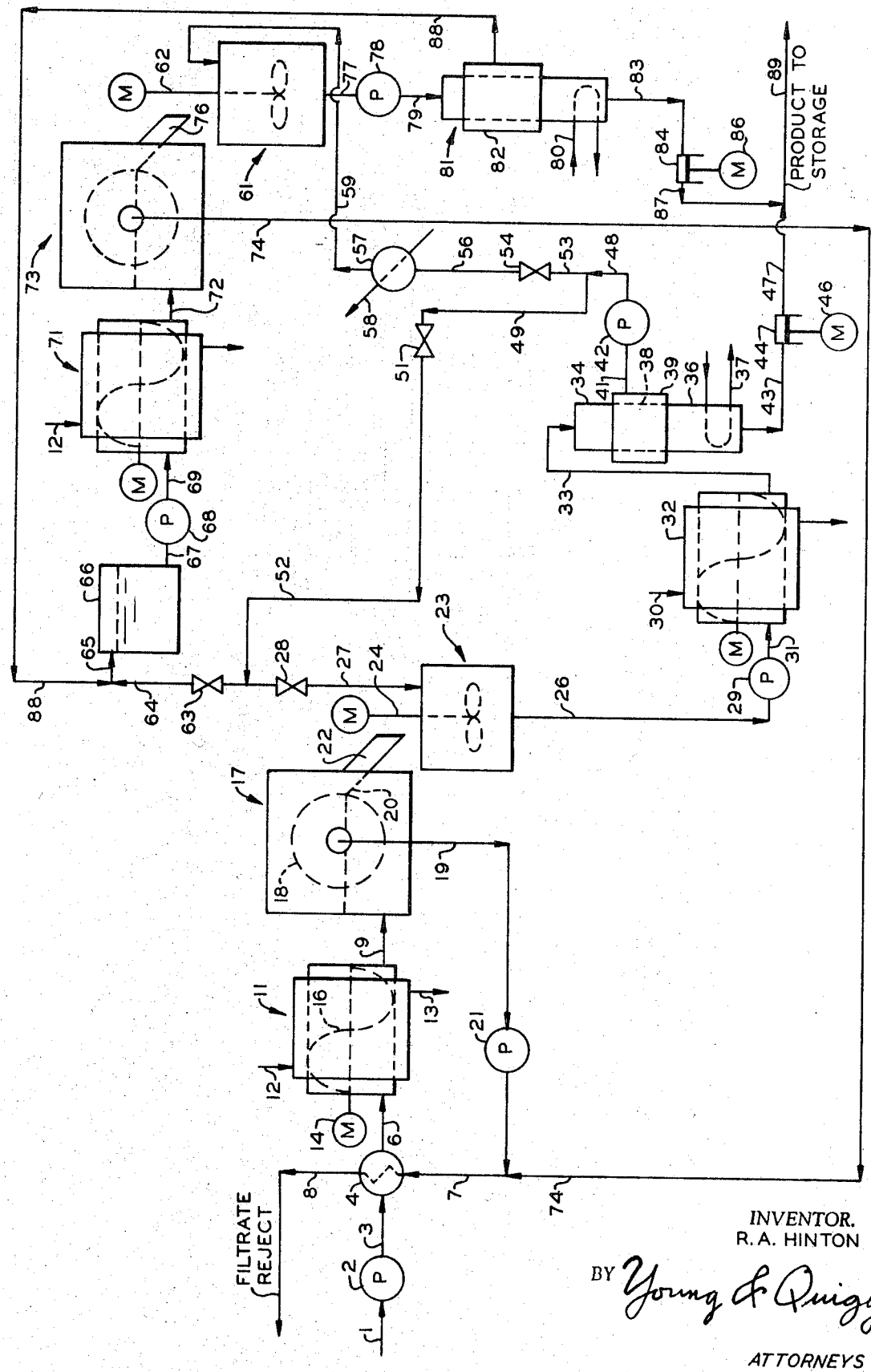

3,561,225
APPARATUS AND PROCESS FOR 4-STEP SEPARATION OF A CRYSTALLIZABLE COMPONENT OF A MIXED FEEDSTOCK
Robert A. Hinton, Bartlesville, Okla., assignor to Phillips Petroleum Company, a corporation of Delaware
Filed Aug. 26, 1968, Ser. No. 755,088
Int. Cl. B01j 9/04
U.S. Cl. 62—58                    10 Claims

ABSTRACT OF THE DISCLOSURE

This invention is a 4-step separation process. A feedstock is partially frozen, (1) the resulting crystals are separated from the remaining liquid, the crystals are purified by countercurrent contact with some of the melt obtained by melting the purified crystals, (2) the remaining melt is separated as product, the mother liquor from the purification is partially frozen, (3) the resulting crystals are separated from the remaining liquid, the crystals are purified as in (1), and (4) the remaining melt is separated as product. This saves refrigeration over the prior art.

A more complete abstract is given in the next two paragraphs.

A first feedstock containing a mixture of components is cooled in a first cooling step to at least partially crystallize at least one of said components from solution to form a first slurry of crystals in a first noncrystallized mother liquor. In a first separation step said first crystals are separated from said first mother liquor. Said first crystals from said first separation step are slurried with a second mother liquor to form a second slurry, cooled in a second cooling step and passed into a first crystal purification zone into contact with a first heating element at the end of said zone. Some of the resulting first melt from the end of said zone is taken off in a second separation step as the separated first component product, while some of said first melt is passed in countercurrent contact with said first crystals wherein it is refrozen and returned to the melt zone. The refreezing action displaces occluded mother liquid from the crystals, which is removed in a filter zone upstream of said melt zone as said second mother liquor. Some of said second mother liquor is mixed with a third mother liquor and cooled in a third cooling step to form a third slurry of second crystals of said first component in a fourth mother liquor. In a third separation step said second crystals are separated from said fourth mother liquor. Said second crystals from said third separation step are slurried with some of said second mother liquor to form a fourth slurry and passed into a second crystal purification zone into contact with a second heating element at the end of said second zone. The resulting second melt from the end of said second zone is taken off in a fourth separation step as more of the separated first component product, while some of said second melt is passed back in countercurrent contact with said second crystals so as to purify said second crystals of occluded mother liquor which is removed from said second zone ahead of said second heating element as said third mother liquor and passed with some of said second mother liquor to said third cooling zone as described above. Said first and fourth mother liquors are heat exchanged with said first feedstock prior to said first cooling step in order to save refrigeration.

By not recycling the first and fourth mother liquors from the first and third separation steps, and by not recycling the second and third mother liquors to the feedstock prior to said first cooling and first separation step, and by heat exchanging said first and fourth mother liquors with said feedstock prior to said first cooling step, in Example 1 a savings of 429,000 B.t.u./hour in refrigeration is achieved over the prior art of Example 2.

FIELD OF THE INVENTION

This invention relates to Class 62, Refrigeration, Subclass 58, Processes, Fractionally Solidifying With Separating, e.g., Dewaxing. It is an improvement over the process and system shown in Wilson 3,050,953, patented Aug. 28, 1962.

DESCRIPTION OF THE PRIOR ART

Kolner 2,886,587, patented May 12, 1959, Class 260, Subclass 475, separates some mother liquor at 15 and some at 25, but recycles some at 24 to first chiller 12, and does not teach the present invention of processing the mother liquor from 35 of Kolner separately through third and fourth crystallization separation stages.

Croley 2,940,272, patented June 14, 1960, Class 62, Subclass 58, removes some mother liquor at 31 but recycles some at 85 ahead of the first chiller 7, and does not show said third and fourth separation stages.

Talbot 2,985,694, patented May 23, 1961, Class 260, Subclass 674, removes all the mother liquor at 18 and does nothing with it.

Marwil 3,050,952, patented Aug. 28, 1962, Class 62, Subclass 58, removes all the mother liquor in line 5 of FIG. 1 and in line 25 of FIG. 2, whereas in the present invention mother liquor is removed from filter 17 in line 19 and from filter 73 in line 74.

Wilson 3,050,953, patented Aug. 28, 1962, Class 62, Subclass 58, shows the first two separation steps 4 and 14a, but does not have the third and fourth separation steps on his mother liquor 19. To convert Wilson into the present invention, one would have to have two systems, both as shown in the Wilson drawing placed side by side, close valve 23 on the first system and run line 22 of the first system into line 1 of the second system, close valve 21 in the second system and run line 18 from the first system into line 8, 9 of the second system. Chiller 10 in the second system would then be unnecessary, or a temperature balance unit 57 of the present application could be substituted. Valve 17 of the second system would be closed and there would be no feed to line 1 of the second system except lines 22 of both systems. Such radical changes to the structure and process of Wilson would not have been obvious at the time the present invention was made to any person having ordinary skill in this art, and therefore are believed clearly patentable in the present application.

SUMMARY OF THE INVENTION

This invention is a 4-step separation process. A feedstock is partially frozen (1) the resulting crystals are separated from the remaining liquid, the crystals are purified by countercurrent contact with some of the melted crystals and said crystals then melted, (2) the melt is separated as product, the mother liquor from the purification is partially frozen, (3) the resulting crystals are separated from the remaining liquid, the crystals are purified as in (1), and (4) the melt is separated as product. This saves refrigeration over the prior art.

A first feedstock containing a mixture of components is cooled in a first cooling step to crystallize a first component to form a first slurry of first crystals in a first mother liquor. In a first separation step said first crystals are separated from said first mother liquor. Said first crystals from said first separation step are slurried with a second mother liquor to form a second slurry, cooled in a second cooling step and passed into a first crystal purification zone into contact with a first heating element at the end of said zone. The resulting first melt from the end of said zone is taken off in a second separation step as some of the separated first component product, while some of said first melt is passed back in countercurrent contact with said first crystals whereby it refreezes and displaces impurities which are removed from said zone ahead of said heating element as said second mother liquor. Some of said second mother liquor is mixed with a third mother liquor and cooled in a third cooling step to form a third slurry of second crystals of said first component in a fourth mother liquor. In a third separation step said second crystals are separated from said fourth mother liquor. Said second crystals from said third separation step are slurried with some of said second mother liquor to form a fourth slurry and passed into a second crystal purification zone into contact with a second heating element at the end of said second zone. The resulting second melt from the end of said second zone is taken off in a fourth separation step as more of the separated first component product, while some of said second melt is passed back in countercurrent contact with said second crystals and refrozen while displacing impurities from the crystals, said impurities being removed from said second zone ahead of said second heating element as said third mother liquor and passed with some of said second mother liquor to said third cooling zone as described above. Said first and fourth mother liquors are heat exchanged with said first feedstock prior to said first cooling step in order to save refrigeration.

By not recycling the first and fourth mother liquors from the first and third separation steps, and by not recycling the second and third mother liquors to the feedstock prior to said first cooling and first separation step, and by heat exchanging said first and fourth mother liquors with said feedstock prior to said first cooling step, in Example 1 a saving of 431,000 B.t.u./hour in refrigeration is achieved over the prior art of Example 2.

BRIEF DESCRIPTION OF THE DRAWINGS

The single figure of the drawings, which needs no number, is a schematic view and flow diagram of a plant embodying the apparatus and the process of the present invention for 4-step separation of a crystallizable component 89 of a mixed feedstock 1.

DESCRIPTION OF THE PREFERRED EMBODIMENT

In the figure of the drawing, a mixed component feedstock 1 containing a first crystallizable component is pumped by pump 2 through line 3, heat exchanger 4 and line 6.

A mixed component feedstock has a first crystallizable component when that component is present in such concentration that when the feedstock is cooled the freezing point is reached on the curve running from the freezing point of 100% of that component to the eutectic freezing point of the feedstock, and cooling is continued down that curve toward but not to said eutectic freezing point, so that as a result the crystals that freeze out of the mother liquor contain only said first crystallizable component. However, appreciable amounts of the other components are trapped as liquid occlusions in the crystal mass and need to be removed. The actual freezing points of the various pure components that make up the feedstock have no relation to the invention, as the eutectic freezing point is always lower than any one of them.

Therefore, the present process applies equally well to the concentration of fruit juices, vegetable juices, beer, alcoholic solutions, and many aqueous and nonaqueous mixtures. The examples used in this application relate to nonaqueous mixtures, particularly the separation of 99.5% pure para-xylene from mixtures such as in Table 1 of Example 1. However, methylethylpyridine is similarly separable by this invention (as also taught by Wilson, cited). The present invention is broad to separating any first crystallizable component from a mixed component feedstock which exhibits eutectic-type phase behavior.

The feedstock in line 3 passes in indirect heat exchange with the first and fourth mother liquor in lines 7 and 8, and this saves on refrigeration. For example, 7 may be at about −89° F. and 3 at 100° F., which would change to about 58° F. in line 8 and −38° F. in line 6. In line 9, after passing in heat exchanger 11 in indirect heat exchange with refrigerant 12 entering at −100° F. and leaving at 13 at about −89° F., the temperature in line 9 would also be about −89° F. The exact temperatures are not significant and are not the same for different materials. The temperatures given here as examples are for paraxylene concentration of Example 1 below.

Cooler 11 can be any one of many types of coolers known in the prior art, but the preferred type, in order to be efficient in use of materials and reduce the time in the process, is a scraped surface chiller in which motor 14 is rotating a helical surface-scraping blade 16 to scrape the crystals off of the cooling surface as they form, just as in the conventional ice cream freezer.

Line 9 leads into a separation step 17. As pointed out in Wilson, cited, column 2, lines 62–64, part 17 can be a decantation tank, centrifuge (neither one shown), filter or other apparatus (not shown) known in the prior art for solid-liquid separation. Actually, the efficiency of centrifuges (not shown) and the rotary scraped filter shown are so high that nothing else will be likely to be used. Most preferred is the rotary scraped surface filter having a revolving drum with a filter cloth face 18 which picks up the crystals as the first mother liquor is sucked out line 19 from the interior of the filter drum 18. The picked up crystals are scraped off drum 18 by fixed doctor blade 20 as drum 18 rotates and pump 21 sucks out the mother liquor 19, and the crystals fall down chute 22 into reslurrying tank 23. Rotary filter 17 is old in many prior patents, such as Croley, cited, where it is given reference number 15.

Returning to the present figure, the crystals from chute 22 are reslurried in tank 23, preferably by a motor-driven propeller 24 to save time, and the slurry fed into line 26. The reslurrying and some melting occurs as some second mother liquor 27 is added by adjusting valve 28. The slurry is pumped by pump 29 through line 31 into a second cooling step in indirect heat exchange with refrigerant 30 in chiller 32, which is similar to chiller 11, except the refrigerant need not be as cold; for example, refrigerant 30 can be from 0 to −20° F. This causes additional freezing of para-xylene in said added second mother liquor and the resulting crystal slurry passed through line 33 into crystal purification zone 34.

Zone 34, as explained in Wilson, cited, is old in U.S. Re. Pat. 23,810 to Schmidt, patented in 1954, and can also include intermittent flow of reflux by means of a pulsator as taught by U.S. Pat. 2,854,494, patented by Thomas on Sept. 30, 1956. A wet cake of crystals is forced down column 34 by pump 29 into reflux zone 36 heated by heater 37 past filter screen 38. As heater 37 melts the crystals the second mother liquor passes upward through the crystals in zone 36 and out the screen 38 into line 41 and is pumped by pump 42. The melted, purified, first crystallizable component emerges in line 43, is pulsed by piston 44 reciprocated by motor 46 to send pressure waves back into zone 34. It is not necessary to pulse at 44, as Schmidt, cited, operated without it; but as Thomas, cited, shows, pulser 44 adds to the efficiency of the separation process.

This product, as pumped into line 47, can be as high as 99.5% of the first crystallizable component, which in Example 1 below is para-xylene.

The second mother liquor is pumped by pump 42 into line 48 where it is split into two portions, about twice as much going into line 49 controlled by valve 51 into line 52 as into line 53 controlled by valve 54 into line 56. Until reaching valve 54, much of what has occurred also occurs in Wilson, cited.

In making this invention, it was calculated that some heating or cooling would be necessary to balance everything out, so a heat exchanger 57 was provided for indirect heat exchange between the second mother liquor in line 56 with a heating or possibly a cooling fluid in line 58. However, in Example 1 below it was found out by calculation that no heating or cooling was necessary at this point, so it is not always necessary and therefore need not be claimed. However, it is believed wise to have it available for insurance in case different feedstocks are used.

The second mother liquor in line 59 is added to reslurrying tank 61 stirred preferably by propeller 62.

Going back to valves 28 and 63, about half of the second mother liquor in line 52 passes through valve 28 into tank 23, while the other half passes through valve 63 into line 65 where it joins about two-thirds as much third mother liquor from line 88 and is stored in surge tank 66. Of course, a surge tank is not essential to the operation of the invention and is not claimed, but it does make everything work better with less attention and less adjusting of valves every now and then.

From surge tank 66 the mixed second and third mother liquor is pumped from line 67 by pump 68 into line 69 and through third chiller 71 which is identical to first chiller 11, even as to relatively low temperature refrigerant 12 which may be about $-100°$ F. in Example 1 below. The resulting slurry passes through line 72 into the third separation step 73 which is identical to first separation step 17. The fourth mother liquor passes out of step 73 in line 74 to line 7, heat exchanger 4, and line 8 without either the first or fourth mother liquor being recycled to any point in the system, particularly not being added to the feed at 6 and the refrigeration load on chiller 11. That is one way in which refrigeration requirements are unexpectedly reduced.

The second crystals from chute 76 pass into reslurrying tank 61 where some melting and slurrying with some second mother liquor from line 59 occurs. Then the resulting crystal slurry passes through line 77, pump 78 and line 79 into the second crystal purification zone 81, heated at 80, having a screen 82, melted product outlet 83, with or without pulsating piston 84 reciprocated by motor 86, the product 87 usually being blended with product 47 as product 89. It is not necessary to blend 47 and 87, and they can be collected separately in separate tanks (not shown) if desired. As the second crystal purification zone is identical to the first crystal purification zone, no further description is believed necessary.

EXAMPLE 1

The system shown in the drawing is operated to produce a product of 99.5 weight percent para-xylene from a typical plant feedstock stream A, the composition of which is as follows:

TABLE 1.—COMPOSITION OF FEEDSTOCK A

| Hydrocarbon: | Weight percent |
|---|---|
| Para-xylene | 20.9 |
| Ortho-xylene | 17.5 |
| Meta-xylene | 33.4 |
| Ethylbenzene | 27.5 |
| Toluene | 0.7 |
|  | 100.0 |

The flow in pounds per hour and the weight percentage para-xylene content are as follows:

TABLE 2.—FLOW OF MATERIALS IN VARIOUS LINES IN POUNDS/HOUR AND PARA XYLENE CONTENT, WEIGHT PERCENT

| | Line | | | | | | | | |
|---|---|---|---|---|---|---|---|---|---|
| | 1 | 22 | 19 | 27 | 26 | 41 | 47 | 87 | 89 |
| Flow | 36,618 | 7,618 | 29,000 | 2,430 | 10,048 | 6,203 | 3,845 | 1,146 | 4,991 |
| Percent | 20.9 | 68 | 8.5 | 35.3 | 60 | 35.3 | 99.5 | 99.5 | 99.5 |

| | Line | | | | | | | |
|---|---|---|---|---|---|---|---|---|
| | 49 | 64 | 53 | 76 | 77 | 88 | 65 | 74 | 8 |
| Flow | 4,873 | 2,443 | 1,330 | 1,661 | 2,991 | 1,845 | 4,288 | 2,627 | 31,627 |
| Percent | 35.3 | 35.3 | 35.3 | 80 | 60 | 35.3 | 35.3 | 8.5 | 8.5 |

The British thermal units in millions of B.t.u. added or removed per hour and the resulting temperatures in some of the lines are as follows:

TABLE 3.—TEMPERATURE AND HEAT ADDED OR SUBTRACTED IN MILLION B.T.U./HOUR

| | Line | | | | | | |
|---|---|---|---|---|---|---|---|
| | 3 | 4 | 6 | 7 | 8 | 11 | 12 | 30 |
| °F | 100 | | $-38$ | $-89$ | 58 | | $-100$ | $-20$ |
| B.t.u. (mm.)/hr | | $-2.035$ | | | | $-.965$ | | |

| | Line | | | | | | |
|---|---|---|---|---|---|---|---|
| | 32 | 71 | 79 | 37 | 80 | 57 | 47 | 87 |
| °F | | | | $-12$ | | | 100 | 100 |
| B.t.u. (mm.)/hr | $-.410$ | $-0.206$ | | $.409$ | $.121$ | 0 | | |

Low temperature refrigeration at 11 and 71 ($-100°$ F.) is 1,171,000 B.t.u./hr.

High temperature refrigeration at 32 (0° F.) is 410,000 B.t.u./hr.

The total refrigeration is 1,581,000 B.t.u./hr.

The total heating is 530,000 B.t.u./hr.

Many other hydrocarbons may be in the feedstock for this para-xylene purification, so long as the feedstock consists essentially of para-xylene, ortho-xylene and meta-xylene.

The benefits expected from this process of Example 1 are summarized as:

(1) Due to the high para-isomer content (about 35%), the size of crystals produced in the mother liquor scraped surface exchanger 71 should be adequate for satisfactory operation of the pulse column 81.

(2) The combination of the cold crystals (usually less than $-85°$ F. temperature) from the mother liquor filter 73 with warm mother liquor 59 will result in growth of the para-crystals in the slurry tank due to fusion of para-isomer from the mother liquor as the crystals temperature increases to the desired pulse column slurry feed temperature. The result should be a slurry containing unusually large crystals for processing in the pulse column.

(3) Due to the relatively large crystal size, the purity of cake 76 discharged by the mother liquor filter 73 should be considerably greater than the purity of cake discharged by the primary stage rotary filter 17 (perhaps in the range of about 80% para-isomer versus 68% para-isomer). The higher para-content of the filter cake will permit blending back a larger percentage of mother liquor directly to the pulse column feed and thereby decrease the primary stage refrigeration requirements.

(4) The production of a crystal slurry with crystal size adequate for satisfactory operation of a pulse column will completely eliminate the need for refrigeration in line 77, 79 like chiller 32 in lines 26, 31, 33 for processing of the mother liquor stream.

(5) Elimination of the necessity for blending the high concentration para mother liquor stream 41 back into the fresh feed 1 to the primary stage 4 to 11 will decrease the para content of the stream flowing through the precoolers and the primary chillers, thus decreasing the initial freezing point of the stream and thereby allowing either more efficient utilization of refrigeration available in the filtrate, or a reduction in the area of scraped surface heat exchange equipment required for equivalent utilization of refrigeration available in the filtrate stream.

With assumption of 60% or more cake purity from the primary rotary filter and about 80% cake purity from the mother liquor rotary filter, calculations have indicated that mother liquor from pulse columns can be processed in this modified process with only 63 percent of the refrigeration (both high and low level) that would be required in the conventional process flowscheme. Additional savings in primary refrigeration and/or scraped surface exchanger investment due to more efficient utilization of filtrate precooling of the fresh feed have not been estimated.

EXAMPLE 2

The system shown in the U.S. patent to Wilson, 3,050,953, is operated to produce the same product of 99.5 weight percent para-xylene from the same feedstock A of Example 1 above.

The flow in pounds per hour and the weight percentage of para-xylene content is as follows:

TABLE 4.—FLOW OF MATERIALS IN POUNDS/HOUR AND PARA-XYLENE CONTENT, WEIGHT PERCENT

| | Line | | | | | | | | |
|---|---|---|---|---|---|---|---|---|---|
| | 1 | 6 | 5 | 20 | 11 | 14a | 16 | 18 | 19 | 22 |
| Flow | 36,618 | 31,627 | 12,876 | 179 | 13,055 | 4,991 | 8,064 | 0 | 8,064 | 7,885 |
| Percent | 20.9 | 8.5 | 70 | 35.3 | 69.5 | 99.5 | 35.3 | 0 | 35.3 | 35.3 |

Incidentally, while Wilson, cited, does not show it, it is common practice to have indirect heat exchange between his lines 6 and 1 in the same manner as between lines 3 and 8 at 4 of the present invention, as this is an obvious economy in refrigeration. So it seems only fair to compare Wilson, cited, with such a heat exchange included, referred to as "HE 4" in Table 5 below, as otherwise Wilson would be badly outclassed.

The British thermal units in millions of B.t.u. added, or removed, per hour and the resulting temperature in some of the lines are as follows:

TABLE 5.—TEMPERATURE AND HEAT ADDED OR SUBTRACTED IN MILLION B.T.U./HOUR AND TEMPERATURE OF SOME LINES

| | Line | | | | | |
|---|---|---|---|---|---|---|
| | 1 | "HE 4" (not shown) | Inlet to 2 | 2 | 10 | 14 | 14a |
| °F | 100 | | −38 | | | | 100 |
| B.t.u. (mm.)/hr | | −2,035 | | −1.473 | −.539 | .530 | |

Low temperature refrigeration at 2 (−100° F.) is 1,473,000 B.t.u./hr.

High temperature refrigeration at 10 (0° F.) is 539,000 B.t.u./hr.

The total refrigeration is 2,010,000 B.t.u./hr.
The total heating is 530,000 B.t.u./hr.

The present invention in Example 1 produced the same amount of the same purity (99.5 weight percent) para-xylene with only 1,581,000 B.t.u./hour of refrigeration, instead of the comparatively excessive amount of 2,010,000 B.t.u./hour of refrigeration required by the device of Wilson, cited, an improvement of 429,000 B.t.u./hour over the prior art as calculated in Example 2.

The invention is not limited to the above description of an illustrative embodiment thereof, as it will be evident to those skilled in the art that various modifications may be made without departing from the spirit and scope thereof.

I claim:

1. A process for a 4-stage separation of a first crystallizable component of a first mixed feedstock, comprising the steps of:

cooling said first mixed feedstock containing a mixture of components including said first crystallizable component in a first cooling step to form a first slurry of first crystals containing said first component in a first mother liquor;

separating said first crystals from said mother liquor in a first separation step;

slurrying said separated first crystals with some of a second mother liquor subsequently produced to produce a second slurry;

cooling said second slurry in a second cooling step;

forcing said cooled second slurry into a first crystal purification zone into contact with a first heating element at the end of said zone to melt the crystals in said second slurry into a first melt;

forcing some of said first melt from the end of said first zone in a second separation step from the remainder of said first melt as the first crystallizable component product of the process;

forcing some of said first melt back into countercurrent contact with said crystal slurry thereby displacing occluded impurities which are removed as a second mother liquor;

forcing said second mother liquor out of said first zone at a point removed from said first heating element;

mixing said second mother liquor with a third mother liquor subsequently produced to form a second mixed feedstock;

cooling said second mixed feedstock in a third cooling step to form a third slurry of second crystals containing said first component in a fourth mother liquor;

separating said second crystals from said fourth mother liquor in a third separation step;

slurrying said second crystals with some of said second mother liquor to produce a fourth slurry;

forcing said fourth slurry into a second crystal purification zone into contact with a second heating element at the end of said zone to melt the crystals in said fourth slurry into a second melt;

forcing some of said second melt from the end of said second zone in a fourth separation step as the first crystallizable component product of the process;

forcing some of said second melt back into countercurrent contact with said fourth crystal slurry thereby displacing occluded impurities which are removed as the third mother liquor; and forcing said third mother liquor out of said second zone at a point removed from said second heating element.

2. The process of claim 1 including passing said first and fourth mother liquors in indirect heat exchange with said first feedstock prior to said first cooling step.

3. The process of claim 1 including adjusting the temperature of that portion of the second mother liquor passing to the slurrying of said second crystals after said third separation step.

4. The process of claim 3 including passing said first and fourth mother liquors in indirect heat exchange with said first feedstock prior to said first cooling step.

5. The process of claim 3 in which the first crystallizable component is para-xylene.

6. The process of claim 3 in which the first feedstock is a mixture consisting essentially of para-xylene, ortho-xylene and meta-xylene.

7. A 4-stage separation system, comprising in combination:

a first feedstock line connected to a first crystallizer and a first liquid solids separator in series;

a first mother liquor outlet line connected to the first separator;

a first slurry tank disposed to receive solids from the first separator and some second mother liquor from a second mother liquor line;

a second crystallizer with its inlet connected to said first slurry tank and its outlet connected to the inlet of a first crystal purification column;

said first column having a first heating element in its other end, a restricted product outlet downstream of said heating element, and a second mother liquor outlet spaced upstream from said heating element;

a third crystallizer having its inlet connected to said second mother liquor line and a third mother liquor line and its outlet connected to a third liquid solids separator;

said third separator having a fourth mother liquor outlet line and a solids outlet;

a second slurry tank disposed to receive solids from and third separator and mother liquor from said second mother liquor line; and a second crystal purification column having an inlet connected to said second slurry tank, a second heating element in its downstream end, a product outlet at its downstream end, and a third mother liquor outlet spaced upstream from said second heating element.

8. The combination of claim 7 including a temperature adjusting means in the second mother liquor line between the first crystal purification column and the second slurry tank.

9. The combination of claim 7 including an indirect heat exchange means between the first feedstock line and the first and fourth mother liquor lines.

10. The combination of claim 8 including an indirect heat exchange means between the first feedstock line and the first and fourth mother liquor lines.

References Cited

UNITED STATES PATENTS 2,881,230  4/1959  Buell _____ 23—273
3,050,952  8/1962  Marwil _____ 62—58

NORMAN YUDKOFF, Primary Examiner

S. SILVERBERG, Assistant Examiner

U.S. Cl. X.R.

62—124; 260—674